April 25, 1950  C. J. CRAFT, III  2,504,963
COLD CATHODE GAS TUBE TRIGGER PULSE CIRCUIT
Filed April 29, 1949

INVENTOR
C. J. CRAFT 3RD
BY
J. W. Schmied
ATTORNEY

Patented Apr. 25, 1950

2,504,963

UNITED STATES PATENT OFFICE 2,504,963

COLD CATHODE GAS TUBE TRIGGER PULSE CIRCUIT

Clifford J. Craft, 3rd, Flushing, N. Y., assignor to Bell Telephone Laboratories, Incorporated, New York, N. Y., a corporation of New York Application April 29, 1949, Serial No. 90,501

9 Claims. (Cl. 315—271)

This invention relates generally to trigger pulse circuits and more specifically to trigger pulse circuits employing cold cathode gas tubes.

One of the objects of this invention is to produce a low current trigger pulse output voltage which approaches the peak value of the alternating input voltage applied to a pulse generating circuit.

Another object of this invention is to obtain a high impedance trigger pulse voltage source.

A third object is improvement of cold cathode gas tube trigger pulse circuits generally.

The trigger pulse circuit employed in this invention utilizes a gas tube having a probe therein. The gas tube employed conducts current in either direction. Because of this characteristic of the tube, the electrodes that would normally be designated as the main cathode and the main anode of the tube are herein defined as cathanodes. One of the cathanodes, however, has a much larger surface area than the other which results in a larger current flowing in the tube when the larger of the two cathanodes acts as the cathode as compared to that which flows when the smaller of the two cathanodes is utilized as a cathode. A current limiting resistance is connected to the large area cathanode, and an alternating voltage is applied across this resistance and the gaseous space path between the two cathanodes. The aforementioned probe is connected to the potential source side of the current limiting resistance through a load resistance. The output pulse voltage which is developed across the load resistance tends to follow the potential with respect to ground of the particular cathanode which acts as an anode for a given input half cycle from said alternating voltage source.

A feature of the invention is the use of the probe as an active element in the trigger pulse circuit, said probe having a large resistance connected thereto to produce a high impedance trigger pulse voltage source.

This and other features of the invention will be more fully understood from the following detailed description of the drawings and mode of operation:

Figure 1:
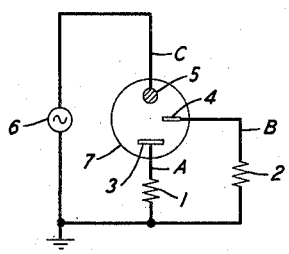
Fig. 1 shows the trigger pulse circuit used in the exemplary embodiment of the invention.

In Fig. 1 there is shown a circuit for the generation of 140-volt output trigger pulses every other half cycle of the 150-volt, 60-cycle source 6. Element 7 is a cold cathode 3-element gas tube, one of the three elements being probe 4. The other two elements comprise a cathanode 5 and cathanode 3. The term "cathanode" is used herein to define an element of a gas tube which may be used either as a cathode or an anode, depending upon the polarity of the voltage applied to the tube terminals. In the exemplary embodiment of the invention described in this specification, cathanode 5 has a much smaller surface area than does cathanode 3, with the result that a given voltage applied across the gas tube will produce more current in one direction than will be produced when the polarity of said voltage is reversed. Resistance 2 in the probe circuit has a value of approximately 4 megohms. Resistance 1 has a value of approximately 10,000 ohms.

Figure 2:
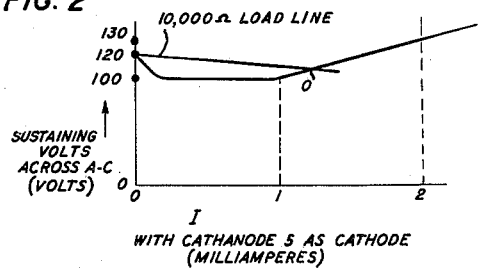
Figs. 2 and 3 illustrate the characteristics of the gas tube current with given sustaining voltages.
Figure 3:
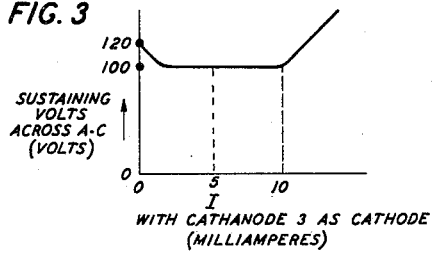

Figs. 2 and 3 graphically show the current variations within the tube of Fig. 1 as the potential between the two cathanodes of the tube is varied in amplitude and polarity. It will be noted that in Fig. 2 the gas tube will conduct up to 1 milliampere with a sustaining voltage of approximately 100 volts when cathanode 5 is utilized as a cathode, and in Fig. 3 a sustaining voltage of 100 volts will produce a tube current up to 10 milliamperes when cathanode 3 is used as a cathode.

Figure 4:
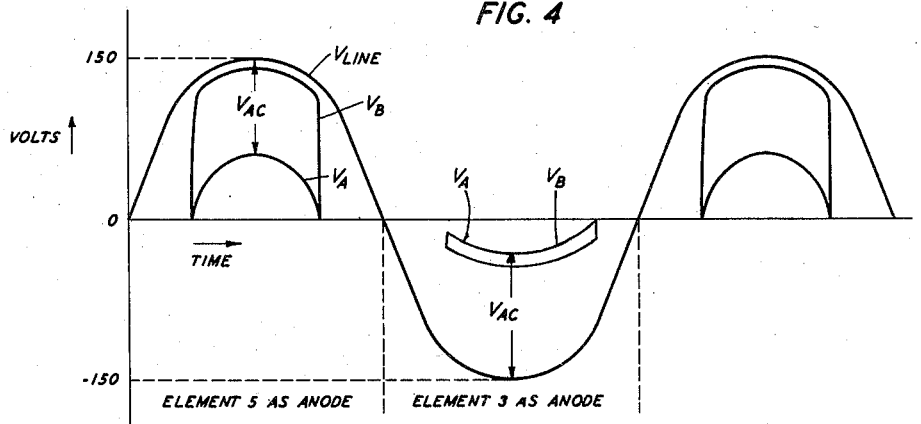
Fig. 4 shows the distribution of the applied line voltage within and outside the gas tube over a complete cycle of said alternating voltage line source.

Fig. 4 illustrates the distribution of voltages in the circuit where the voltage from alternating voltage source 6 is impressed across the tube and resistance 1. This figure will be more fully described below concurrently with the discussion of the operation of the circuit shown in Fig. 1.

Figure 5:
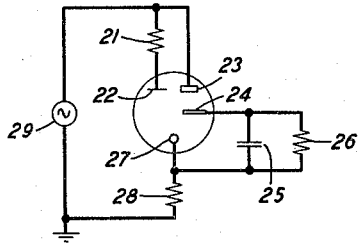
Fig. 5 shows a trigger pulse circuit employing cold cathode gas tubes having a starter anode therein.

In Fig. 5 resistances 21, 26 and 28 have values approximately of 4 megohms, 5 megohms and 5,000 ohms, respectively. Capacitance 25 is 1 microfarad and alternating voltage source 29 has a peak value of 150 volts.

Figure 6:
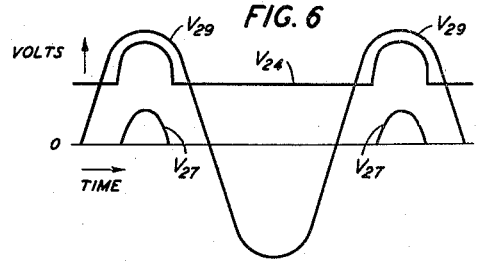
Fig. 6 illustrates graphically the distribution of the instantaneous applied line voltages over the circuit components of the circuit shown in Fig. 5.

Fig. 6 was taken from an oscilloscope screen and shows the distribution of the applied voltage over various portions of the circuit. $V_{29}$ is the line voltage. $V_{24}$ represents the probe voltage and $V_{27}$ illustrates the cathode voltage.

The operation of the circuit shown in Fig. 1 depends on the following principles and design. Tube 7 is capable of conducting current in either direction. For conduction in one direction cathanode 3, which is constructed of molybdenum, because of its large area has a sustaining voltage of about 100 volts up to a current of 10 milliamperes. For conduction in the other direction cathanode 5, which is also constructed of molybdenum, because of its small surface area has a sustaining voltage of 100 volts up to 1 milliampere. If the current becomes larger than one milliampere, the sustaining voltage also becomes increasingly larger. For example, at 2 milliamperes the sustaining voltage is approximately 130 volts.

Resistance 1 has been chosen so that approximately 5 milliamperes will be conducted through tube 7 when cathanode 3 is utilized as the cathode and alternating voltage source 6 has a peak value of 150 volts. The sustaining voltage of tube 7 will be approximately 100 volts. Since the probe 4 seeks a potential which is about 10 volts below the anode 5 voltage, the probe potential will reach a peak value in the neighborhood of 140 volts. The first half cycle shown in Fig. 4 illustrates the conditions existing in the circuit during this time. The voltage across AC designated as $V_{AC}$ is the sustaining voltage of the tube. The voltage $V_B$ shows the potential of the probe during this half cycle. It is to be noted that inasmuch as anode 5 is of the same potential as line voltage 6 and probe 4 is only 10 volts below the potential of anode 5, that therefore the potential of probe 4 is about 140 volts at the peak value of this half cycle of the applied voltage 6.

When voltage source 6 reverses, element 3 acts as the anode and element 5 becomes the cathode. Due to the difference in size of the two cathanodes hereinbefore discussed, the sustaining voltage of the tube is increased and the current therethrough is decreased during conduction, resulting in a smaller voltage drop across resistor 1. The stable values of current and voltage across tube 7 at the first instant of ionization are shown in Fig. 2 by the intersection of the 10,000-ohm load line with the current-voltage curve at point 0. When the voltage from source 6 attains a value of 120 volts, tube 7 breaks down and immediately assumes the values shown by the intersection point 0. Subsequently, source 6 attains a peak voltage of 150 volts, at which time a peak current of 2 milliamperes passes through the tube as is also indicated in Fig. 2. As in the first half of the cycle the probe 4 tends to assume a potential value approximately 10 volts below the potential of the element which now is acting as the anode which is now element 3. Fig. 4 illustrates the distribution of the applied voltage during this half of the cycle. Element 5 is at the voltage applied by source 6 and anode 3 is at the same said voltage minus the sustaining voltage which increases to a value of approximately 130 volts when 2 milliamperes flow through tube 7, thus placing anode 3 at approximately 20 volts minus at the peak value of this half cycle of the applied voltage 6. Since probe 4 assumes a value of potential of about 10 volts below that of anode 3 the potential of probe 4 is now about 30 volts minus.

From the above description of the circuit shown in Fig. 1 it is apparent that a pulse of about 140 volts is produced on probe 4 during the half cycle of the applied voltage from source 6 in which element 5 is utilized as an anode and that a second pulse having a peak value of 30 volts is produced on probe 4 during that part of the cycle of the applied voltage from source 6 when element 3 is acting as the anode. The large difference in the values of these two pulses allows discrimination between the two pulses and as a consequence the use of the larger of the two pulses as a trigger pulse.

If a probe is added to the conventional triode having a starter anode, a unidirectional pulse voltage can be obtained. The tube is placed in a circuit in such a manner that it conducts current only in one direction, during every other half cycle, when an alternating voltage supply source is applied. In Fig. 5 there is shown a circuit for a possible application of this embodiment of the invention. The gas tube used in this circuit must be chosen with certain requirements in mind. The starter anode to probe and the main anode to probe breakdown voltages must be very high so that breakdown between the starter anode and the probe or the main anode and the probe does not occur thereby ionizing the tube at an undesired time. Furthermore, the tube must have the characteristic of transferring conduction from starter anode to main anode when said anodes are positive with respect to the cathode, but must not transfer conduction from the starter anode to the main anode when the cathode is positive with relation to said anodes. Thus, the tube must conduct current in one direction from the starter anode and the main anode to the cathode but must only be capable of conducting current in the reverse direction from the cathode to the starter anode.

In Fig. 5 the probe 24 is connected to the cathode 27 through a resistance and capacitance arranged in parallel. As starter anode 22 becomes positive with respect to cathode 27, breakdown occurs in the starter anode 22 main cathode 27 gap and subsequently transfers to the main anode 23 main cathode 27 gap. When this occurs, the potential of probe 24 rises to a value of about 10 volts less than the potential of main anode 23, which is at line voltage. During this time condenser 25 is charged to the probe potential and when the supply voltage 29 decreases to a point insufficient to sustain ionization between the main anode 23 and the main anode 27, the tube extinguishes but the charge of condenser 25 maintains the probe potential at a value shown in Fig. 6 and designated $V_{24}$. A gradual dissipation of this charge takes place through the very large resistance 26 until such time as the cycle is repeated and main anode 23 once again becomes a conducting element, whereupon the potential of probe 24 rises sharply again as is shown in Fig. 6.

It is to be understood that this specification only describes exemplary embodiments of the invention and various changes in the selection of circuit elements and in the circuit arrangements may be made without departing from the spirit or scope of the invention.

What is claimed is:

1. A trigger voltage pulse generating circuit comprising a cold cathode gas tube, a plurality of elements within said gas tube including a probe, said gas tube being capable of conducting current bilaterally between the elements therein when an alternating voltage is applied across said gas tube, said probe being connected to one other of said plurality of elements through an impedance network; and an alternating voltage source applied across said gas tube and said impedance network.

2. A trigger voltage pulse generating circuit comprising a cold cathode gas tube, a plurality of elements within said gas tube including a probe and a cathanode, said gas tube being capable of conducting current bilaterally between a plurality of said elements included therein when an alternating voltage is applied across said gas tube, said probe being connected to said cathanode through an impedance network, and an alternating voltage source applied across said gas tube and said impedance network.

3. In a trigger pulse circuit, a gas tube comprising a first cathanode, a second cathanode, and a probe, said gas tube being capable of conducting current from said first cathanode to said second cathanode, and also being capable of conducting current from said second cathanode to said first cathanode, said current in one direction being larger than said current in the other direction for a given voltage applied across the cathanodes, a first resistance connected to said first cathanode, an alternating potential source applied across said first resistance and said second cathanode, and a second resistance connecting said probe to said first resistance.

4. In a trigger pulse circuit, a cold cathode gas tube comprising a first cathanode, a second cathanode, and a probe, said first cathanode having a larger surface area than said second cathanode, said gas tube being capable of conducting current from said first cathanode to said second cathanode and from said second cathanode to said first cathanode, said current in one direction being larger than the current in said other direction for a given value of potential applied across said cathanodes, a first resistance connected to said first cathanode, an alternating voltage source applied across said first resistance and said second cathanode, and a second resistance connecting said probe to said first resistance.

5. A trigger voltage pulse generating circuit comprising a cold cathode gas tube, said gas tube comprising first and second cathanodes and a probe, a first resistance connected to said first cathanode, an alternating voltage source applied across said gas tube and said first resistance, and a second resistance connecting said probe to a junction between said first resistance and said alternating voltage source.

6. A trigger voltage pulse generating circuit comprising a cold cathode gas tube, said cold cathode gas tube comprising a first cathanode, a second cathanode, and a probe, said first cathanode having a larger surface area than said second cathanode, and said gas tube being capable of conducting current bilaterally between said cathanodes, said current in one direction being larger than the current in the other direction when an alternating voltage is applied across said gas tube, a first resistance connected to said first cathanode, an alternating voltage source applied across said first resistance and said second cathanode, and a second resistance connecting said probe to a junction between said first resistance and said alternating voltage source.

7. A trigger voltage pulse generating circuit comprising a cold cathode gas tube having a plurality of elements including a probe, said gas tube being capable of conducting current bilaterally between the elements therein when an alternating voltage is applied across said gas tube, a first resistance connected to one of said elements, an alternating voltage source applied across said gas tube and said first resistance, and a second resistance connecting said probe to a junction between said first resistance and said alternating voltage source.

8. An electrical circuit comprising a cold cathode gas tube comprising a first cathanode, a second cathanode, and a probe, said gas tube being capable of conducting current from said first cathanode to said second cathanode, and also being capable of conducting current from second cathanode to said first cathanode, said current in one direction being larger than said current in the other direction when an alternating voltage source is applied across the cathanodes, a first resistance connected to said first cathanode, an alternating potential source applied across said first resistance and said gas tube, and a second resistance connecting said probe to said first resistance.

9. A trigger pulse voltage generating circuit comprising a cold cathode gas tube, said cold cathode gas tube comprising a starter anode, a main anode, a main cathode, and a probe, an impedance network including a first resistance and a capacitance in parallel connecting said probe to said main cathode, a second resistance connected to said main cathode, and an alternating voltage source applied across said main anode and said second resistance.

CLIFFORD J. CRAFT, 3RD.

No references cited.